H. E. STAMPLEY.
DRINKING DIPPER.
APPLICATION FILED JUNE 29, 1918.
1,289,568.
Patented Dec. 31, 1918.
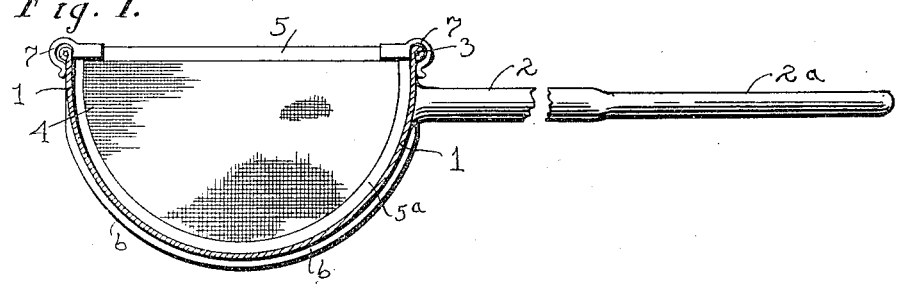
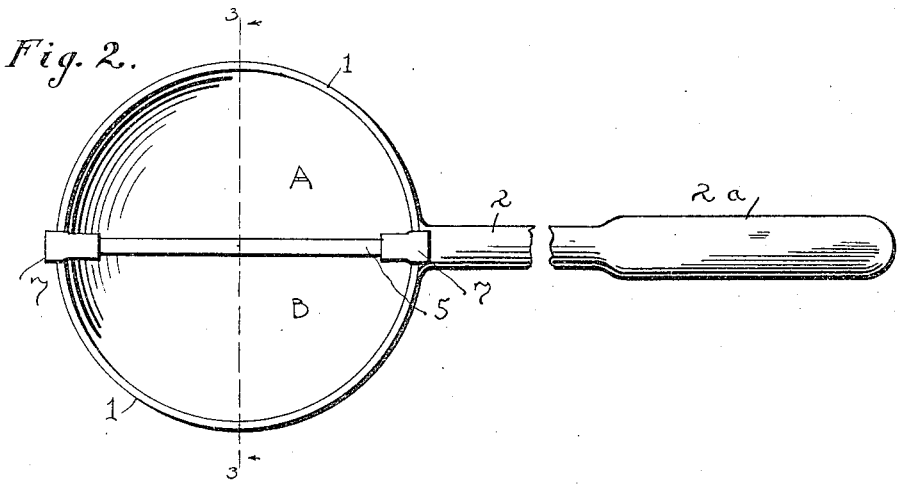
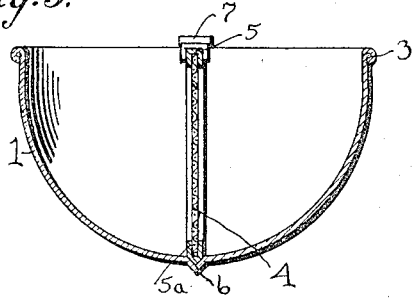
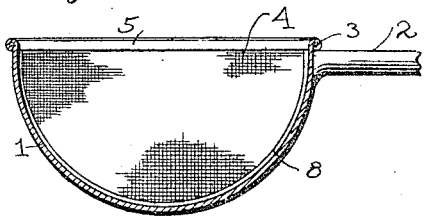
Inventor
H. E. STAMPLEY.
By H. S. Hill
Attorney

UNITED STATES PATENT OFFICE.

HENRY EVANS STAMPLEY, OF SIBLEY, LOUISIANA.

DRINKING-DIPPER.

1,289,568.

Specification of Letters Patent.

Patented Dec. 31, 1918.

Application filed June 29, 1918. Serial No. 242,601.

*To all whom it may concern:*

Be it known that I, HENRY EVANS STAMPLEY, a citizen of the United States, residing at Sibley, in the county of Webster, State of Louisiana, have invented a new and useful Drinking-Dipper; and I do hereby declare the following to be a full, clear, and exact description of the invention, such as will enable others skilled in the art to which it appertains to make and use the same.

The present invention relates to a drinking dipper, and has for its object to provide a device of this character which embodies novel features of construction whereby water or other liquid which is dipped into the same will be filtered or strained and any insects or solid matter removed therefrom before it is poured out of the dipper or conveyed into the mouth for drinking purposes.

Further objects of the invention are to provide a drinking dipper of this character which is comparatively simple and inexpensive in its construction, which can be easily and quickly cleaned, which can be used in substantially the same manner as an ordinary dipper, and which can be manipulated in the dark without any difficulty, thereby enabling water to be taken from an open spring or container and used for drinking without danger of swallowing any insects, leaves, or other trash.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a longitudinal sectional view through a dipper constructed in accordance with the invention, a portion of the handle being broken away.

Fig. 2 is a top plan view of the dipper, a portion of the handle being broken away.

Fig. 3 is a transverse vertical sectional view on the line 3—3 of Fig. 2.

Fig. 4 is a longitudinal sectional view through a modified form of dipper, the end of the handle being broken away.

Corresponding and like parts are referred to in the following description and indicated in all the views of the drawings by the same reference characters.

Referring to the drawings, which illustrate one embodiment of the invention, the numeral 1 designates the bowl of a dipper, and 2 a handle which is rigidly secured to one side of the bowl and projects laterally therefrom. The dipper bowl 1 may be of any suitable size or shape, although in the present instance it is illustrated as having a substantially semispherical configuration, the bottom thereof being rounded while the top is open and surrounded by an outstanding bead 3. A filtering or straining screen 4 extends across the bowl 1 of the dipper and is arranged in alinement with the handle 2, said filtering screen being vertically disposed and subdividing the bowl into the two compartments A and B. The filtering screen may be secured in position in any suitable manner, and in Figs. 1 to 3 of the drawing the screen has binding strips applied to the edges thereof, said binding strips providing a frame for supporting the filtering screen, and the upper strip 5 extending transversely across the open top of the dipper, while the curved binding strip $5^a$ is shown as provided with a V-shaped edge which is adapted to enter and interlock with a correspondingly shaped depression 6 in the bottom and sides of the dipper bowl. Spring clips 7 are applied to the ends of the horizontal binding strip 5 and snap around the exterior bead 3 at the upper edge of the dipper to hold the filtering screen removably in position. The sharp edges of the curved binding strip $5^a$ tend to wedge themselves into the V-shaped groove 5 in the walls of the dipper so that a tight joint is produced between the said members. At the same time the filtering screen is mounted in such a manner that it can be quickly removed and all of the parts of the dipper thoroughly cleaned whenever desired.

In using the dipper it is manipulated to dip water into one of the side compartments, for instance the compartment A, said water being filtered as it passes through the screen 4 into the compartment B, and being conveyed to the mouth from the compartment B, so that there will be no danger of swallowing insects, trash or solid matter when drinking water taken from a spring or open receptacle. The handle 2 has the outer end thereof flattened at $2^a$, the flat sides bearing a known relation to the bowl of the dipper so that a person using the dipper in the dark will have no difficulty in holding it in exactly the proper position to dip water in one side thereof, the water being filtered before it enters the other side of the dipper and being used from the said other side of the dipper.

A slight modification is shown by Fig. 4, in which the filtering screen 4 is permanently secured in position within the dipper, the lower edges thereof being soldered to the walls of the dipper as indicated at 8. However, the dipper is used exactly as previously indicated, and operates to filter or screen the water as it flows from one side of the dipper to the other side thereof preparatory to being used for drinking or other purposes.

Having thus described the invention, what I claim as new and desire to secure by Letters Patent, is:—

1. A dipper including a bowl having a groove in the bottom and sides thereof and provided with a rib at the mouth thereof, a vertically disposed filtering member arranged within the bowl and having the edges thereof fitted within the groove, and resilient latch members carried by the filter member for snapping around the bead at the mouth of the bowl to lock the filtered member removably in position.

2. A dipper including an open mouthed bowl provided with an exterior bead and having a V-shaped groove in the bottom and sides thereof, a vertically disposed filtering screen extending across the bowl, binding strips applied to the edges of the screen, the lower binding strips having sharp edges which fit in the V-shaped groove of the bowl, and resilient latch members at the top of the filtering screen for snapping around the bead of the bowl to lock the filtering screen removably in position.

In testimony whereof I have signed my name to this specification in the presence of two subscribing witnesses.

HENRY EVANS STAMPLEY.

Witnesses:
J. C. O'NEAL,
J. R. BASTIAN.

Copies of this patent may be obtained for five cents each, by addressing the "Commissioner of Patents, Washington, D. C."